US009760325B2

(12) United States Patent
Morris et al.

(10) Patent No.: US 9,760,325 B2
(45) Date of Patent: *Sep. 12, 2017

(54) AUTOMATIC LOAD BALANCER FOR PRESSES

(71) Applicant: Hewlett-Packard Indigo, B.V., Amstelveen (NL)

(72) Inventors: Steve Morris, Asseret (IL); Philippe Mucher, Maastricht (NL); Nir Gilon, Nes Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,238

(22) Filed: Sep. 25, 2015

(65) Prior Publication Data

US 2016/0019012 A1 Jan. 21, 2016

Related U.S. Application Data

(63) Continuation of application No. 13/456,205, filed on Apr. 25, 2012, now Pat. No. 9,170,758.

(51) Int. Cl.
*G06F 3/12* (2006.01)
*G06Q 10/06* (2012.01)

(52) U.S. Cl.
CPC .......... *G06F 3/1263* (2013.01); *G06F 3/1203* (2013.01); *G06F 3/126* (2013.01); *G06F 3/1217* (2013.01); *G06F 3/1282* (2013.01); *G06Q 10/06* (2013.01); *G06F 3/124* (2013.01); *G06F 2206/1508* (2013.01)

(58) Field of Classification Search
CPC ...... G06F 3/1263; G06F 3/1203; G06F 3/126; G06F 3/1282; G06F 3/1217; G06F 3/124; G06F 2206/1508; G06Q 10/06
USPC ....................................................... 358/1.15
See application file for complete search history.

(56) References Cited

U.S. PATENT DOCUMENTS

| | | | | |
|---|---|---|---|---|
| 5,040,123 A * | 8/1991 | Barber | ............. | G05B 19/41865 700/100 |
| 5,459,850 A * | 10/1995 | Clay | ..................... | G06F 3/0601 703/24 |
| 5,487,144 A * | 1/1996 | Takahashi | ........ | G05B 19/41865 715/212 |
| 5,655,062 A * | 8/1997 | Tompkins | .............. | G06K 15/02 358/1.9 |
| 5,978,560 A * | 11/1999 | Tan | ........................ | G06F 3/1211 358/1.15 |
| 6,145,031 A * | 11/2000 | Mastie | ................... | G06F 3/1211 710/40 |
| 6,373,585 B1 * | 4/2002 | Mastie | ................... | G06F 3/1204 358/1.13 |
| 6,498,656 B1 * | 12/2002 | Mastie | ................... | G06F 3/1259 358/1.13 |
| 7,355,733 B2 * | 4/2008 | Sommer | ............ | H04N 1/00408 358/1.14 |

(Continued)

*Primary Examiner* — Edwin S Leland, III
(74) *Attorney, Agent, or Firm* — HP Inc. Patent Department (57) ABSTRACT

A press load balancer automatically balances the printing load over a number of presses by taking into account the load on each press and the substrates (i.e., paper types) and inks installed on the presses to improve throughput while minimizing load on the press operators.

14 Claims, 6 Drawing Sheets

(56) References Cited

U.S. PATENT DOCUMENTS

| | | | | |
|---|---|---|---|---|
| 7,542,155 B2* | 6/2009 | Paskalev | G06F 3/1217 358/1.13 |
| 8,009,308 B2* | 8/2011 | Field | B41F 33/16 358/1.1 |
| 8,023,129 B2* | 9/2011 | Kawai | G06F 3/1211 358/1.13 |
| 2003/0016374 A1* | 1/2003 | Christodoulou | G06F 3/1204 358/1.12 |
| 2003/0098991 A1* | 5/2003 | Laverty | G06F 3/1205 358/1.15 |
| 2003/0128384 A1* | 7/2003 | Nelson | G06F 3/1217 358/1.15 |
| 2003/0225726 A1* | 12/2003 | Simpson | G06F 17/30244 |
| 2004/0190042 A1* | 9/2004 | Ferlitsch | H04N 1/00233 358/1.15 |
| 2007/0239299 A1* | 10/2007 | Milne | G06Q 10/06 700/100 |
| 2008/0297843 A1* | 12/2008 | Aoki | G06F 3/1208 358/1.15 |
| 2009/0182655 A1* | 7/2009 | Wang | G06Q 30/04 705/34 |
| 2009/0185212 A1* | 7/2009 | Gustafson | G06Q 10/06 358/1.15 |
| 2010/0118330 A1* | 5/2010 | Feijoo | G06F 3/1289 358/1.15 |
| 2010/0214598 A1* | 8/2010 | Hoppenot | G06F 3/1205 358/1.15 |
| 2010/0328706 A1* | 12/2010 | Miyake | G06F 3/1204 358/1.15 |
| 2011/0066269 A1* | 3/2011 | Zhou | G05B 19/41865 700/101 |
| 2011/0208556 A1* | 8/2011 | Nagahara | G06Q 10/06 705/7.14 |
| 2012/0147387 A1* | 6/2012 | Morrison | G06K 15/1861 358/1.1 |
| 2012/0209654 A1* | 8/2012 | Romagnino | G06Q 10/0633 705/7.27 |
| 2012/0330709 A1* | 12/2012 | Khorsheed | G06Q 10/063114 705/7.15 |
| 2013/0063774 A1* | 3/2013 | Nuggehalli | G06F 3/1207 358/1.15 |
| 2013/0100486 A1* | 4/2013 | Mccoog | G06F 3/1204 358/1.15 |
| 2013/0262169 A1* | 10/2013 | Van Der Vyver | A01K 13/006 705/7.14 |
| 2013/0286430 A1* | 10/2013 | Morris | G06F 3/1203 358/1.15 |

* cited by examiner

FIG. 6

AUTOMATIC LOAD BALANCER FOR PRESSES

PRIORITY

This application is a Continuation of commonly assigned and co-pending U.S. patent application Ser. No. 13/456,205 filed on Apr. 25, 2012, the disclosure of which is hereby incorporated by reference in its entirety.

BACKGROUND

A print service provider (PSP) uses digital presses to print a variety of products. The digital presses may be loaded with a variety of substrates. One or more digital front ends (DFEs) convert customer print jobs to the submission format of the digital presses and queue the jobs to the digital presses.

BRIEF DESCRIPTION OF THE DRAWINGS

In the drawings.

Use of the same reference numbers in different figures indicates similar or identical elements.

DETAILED DESCRIPTION

Any print shop with more than four digital presses (e.g., HP Indigo presses) may have difficulty allocating jobs to the presses so that the printing load is balanced over the presses and the work of the press operators in selecting jobs and changing substrates and inks is minimized. The result is that the load on the presses is unbalanced, limiting their throughput, and putting unnecessary strain on the operators.

Most print shops have a management information system (MIS) that receives print jobs from customers and handles job ticketing and tracking. The MIS system sends the jobs to one or more digital front ends (DFEs) that are responsible for converting the jobs from the submission format (e.g., PDF, PPML, PostScript) to the native format of the presses (e.g., JLYT for the HP Indigo presses) and queuing the jobs to the presses.

At some print shops, the MIS system uses job definition format (JDF) connectivity to select which press will be used. However, a job is often printed hours, or even days, after the target press is selected, resulting in poor load balancing over the presses. Therefore many print shops simply defer scheduling to the DFE. To schedule the jobs, the DFE may use a balancing algorithm that takes into account the number of jobs on each press, irrespective of the size of the job. Alternatively the DFE may use a round robin algorithm, which is sufficient when all the print jobs are of similar length but ill-suited at print shops with a wide range of job lengths.

Some print shops have developed their own systems to schedule jobs. However, those systems may require press operator involvement, such as selecting which DFE and press to use. This is demanding work and, even with experienced operators, creates a serious bottleneck in the workflow.

In examples of the present disclosure, a DFE sends print jobs to network accessible storage (NAS) servers instead of presses and a press load balancer (PLB) is deployed to schedule the jobs on the NAS servers. PLB takes jobs from queues on the NASs and sends them to the presses using a scheduling method to select the target press. PLB continuously monitors both the jobs waiting to be printed and the load on the presses. PLB delays the selection of the target press for each job until as late as possible and takes into account the following factors.

1. The priority of the job—The MIS system can set a job's priority in its ticket according to the application (brochures, calendars, photo books, etc.). PLB sorts the jobs according to their priority.

2. The required delivery time of the job—Typically the print shop's customers pay different rates according to the urgency of the job. A job that has to be delivered the following day costs a lot more than a job that can be delivered in ten days. PLB takes the latest delivery time (LDT) into account by raising the job's priority as the delivery time approaches.

3. The state of each press—PLB continuously monitors the state of all the presses. There is no benefit in sending a job to a press that is off as the press may be down from a few hours for maintenance to a few days for repair. Once a press is switched on and is at least in the standby state, PLB may send jobs even while the press is warming up.

4. The printing load on each press—PLB keeps track of the jobs queued on each press and knows how many copies are required and how many sheets in each copy. From this information, PLB knows how long it will take to print all the jobs loaded on the press.

5. "High water" mark for the presses—PLB only queues a job on a press if the jobs already loaded can be printed within a certain time. For example, suppose a job is loaded on a press and it consists of 360 copies of 100 sheets each. The job will take approximately 10 hours to print. If the high water mark is configured as 1 hour, PLB will not send any more jobs to that press until it has less than 1 hour of printing left to do (i.e. 36 copies).

6. The required substrate for the job and the installed substrates on the presses—Most press shops use 40 or more substrates while most presses are only installed with four paper trays. By giving preference to presses with the required substrate installed, PLB reduces the operators' work in switching substrates.

7. The preferred presses for the required substrate—PLB gives priority to presses with the required substrate installed. However, if there is no suitable press available, PLB has a list of "preferred presses" for the most used substrates. This also helps reduce the operators' work in switching substrates.

Figure 1:
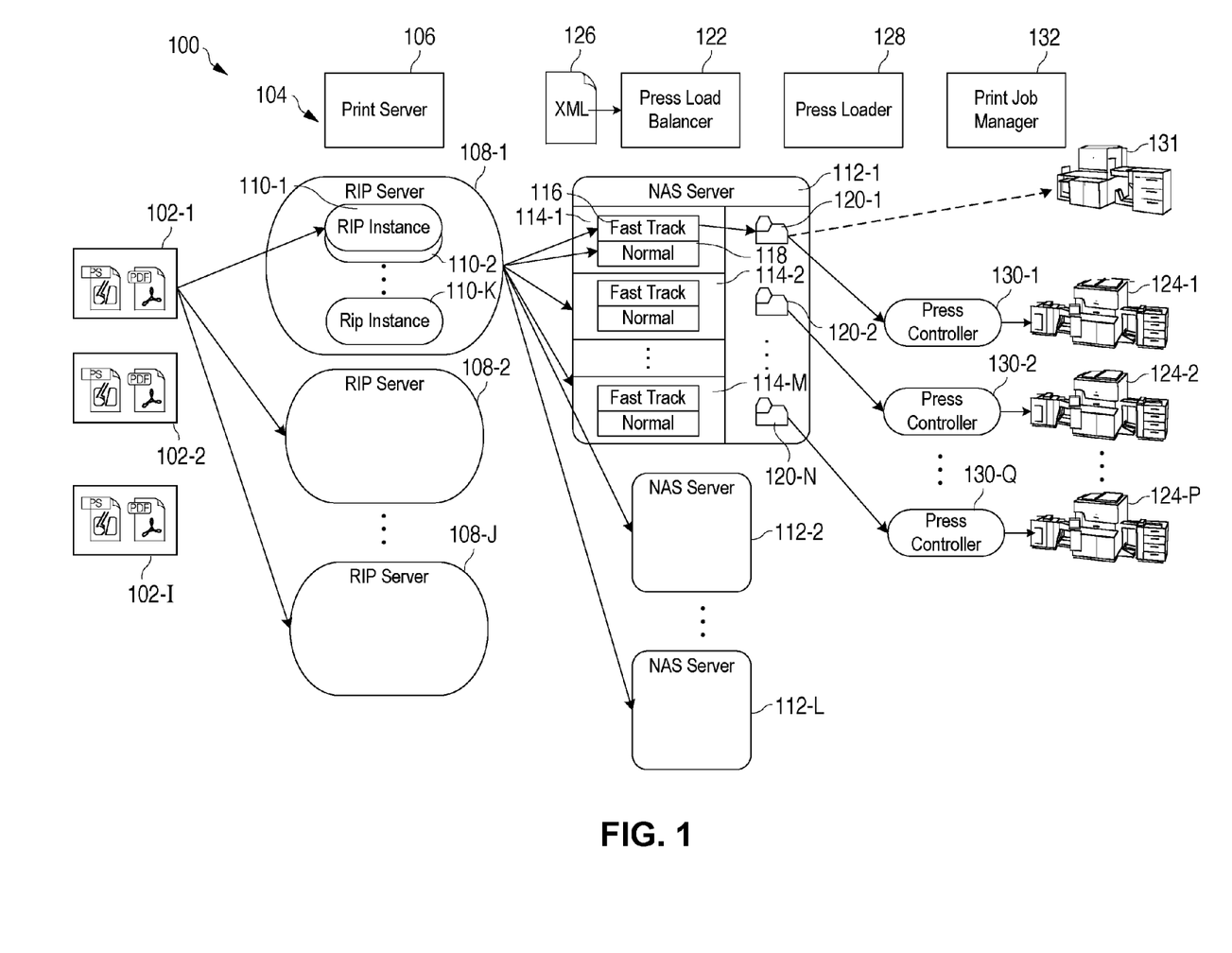
FIG. 1 is a block diagram of a press system in one example of the present disclosure.

FIG. 1 is a block diagram of a press system 100 in one example of the present disclosure. An overview of system 100 is first provided before going into the details of each component.

System 100 includes product pools 102-1, 102-2 . . . 102-I to receive customer print jobs from the MIS of a print shop. Product pools 102-1 to 102-1 have different priority levels where product pool 102-1 has the highest priority while product pool 102-I has the lowest priority. Each product pool defines a job ticket template. In one example, a postscript (PS) bootstrap job ticket is associated with a job to override the job ticket template. In the example, product pools 102-1 to 102-I are used instead to organize the jobs by their priority (e.g., by their latest delivery time). For instance, product pool 102-1 holds jobs that are due today, product pool 102-2 holds jobs that are due tomorrow, product pool 102-3 holds jobs that are due two to three days from today, and so forth.

System 100 includes a DFE 104 with a print server 106 and raster image processor (RIP) servers 108-1, 108-2 . . . 108-J (referred to as "RIP servers 108" collectively or "RIP server 108" for a generic individual RIP server). Printer server 106 may be implemented with the HP SmartStream Ultra Print Server or similar software, and RIP server 108 may be implemented with HP SmartStream RIP Server or similar software. Each RIP server 108 provides RIP instances 110-1, 110-2 . . . 110-K (referred to as "RIP instances 110" collectively or "RIP instance 110" for a generic individual RIP instance). Print server 106 is configured so blocks of RIP instances 110 are allocated each product pool 102. Print server 106 sends the jobs in product pools 102 to RIP instances 110. For each job in product pools 102, print server 106 uses its product pool and its PS bootstrap job ticket to determine each job's priority and ticketing.

RIP instances 110 convert the jobs from the submission format (e.g., PDF) to the press format (e.g., JLYT). Print server 106 directs the outputs from RIP instances 110 to post-RIP queues on NAS servers.

System 100 includes NAS servers 112-1, 112-2 . . . 112-L (referred to as "NAS servers 112" collectively and "NAS server 112" for a generic individual NAS server). Each NAS server 112 has drives 114-1, 114-2 . . . 114-M (referred to as "drives 114" collectively or "drive 114" for a generic individual drive). Drives 114 may be disk drives, solid state drives, or other forms of nonvolatile memory. In one example, each drive 114 has a fast track post-RIP queue 116 and a normal post-RIP queue 118. Each drive 114 also has press loader queues 120-1, 120-2 . . . 120-N (generically referred to as "press loader queues 120" collectively and "press loader queue 120" for a generic individual press loader queue) assigned to presses 124-1, 124-2 . . . 124-P (referred to as "presses 124" collectively or "press 124" for a generic individual press), respectively. In other words, there is a queue for every press on every drive on the NAS that has a post-RIP queue.

System 100 includes a PLB 122. In one example, PLB 122 continuously monitors the current loads and the installed substrates on presses 124. PLB 122 also continuously monitors post-RIP queues 116, 118 on NAS servers 112. When PLB 122 sees a job in one of the post-RIP queues 116, 118 on NAS servers 112, it allocates the job to a press based on the job size, the press load, the substrate required, and the job priority. PLB 122 may use information in a option rule file 126 (e.g., an XML file) to decide the target press. PLB 122 moves the allocated job from its post-RIP queue 116 or 118 to a press loader queue 120 for the target press 124. Note that a "move" operation transfers a file on the same drive 114 within the same NAS server 112, which is a faster than a "copy" operation that transfers a file from one component to another over a network.

DFE 104 includes a press loader 128. Press loader 128 monitors press loader queues 120 and sends the jobs to press controllers 130-1, 130-2 . . . 130-Q (referred to as "press controllers 130" collectively and "press controller 130" for a generic individual press controller) for the corresponding presses 124-1, 124-2 . . . 124-P. Press loader 128 sends the jobs from press loader queues 120 to press controllers 130 on a first-in, first served basis (i.e., in the order which jobs were written to press loader queues 120). When a press 131 does not have a separate press controller, press loader 128 sends jobs from a press loader queue 120 directly to press 131. Press loader 128 may be implemented with the HP SmartStream Ultra Job Loader or similar software.

DFE 104 includes a job manager 132. A press operator may use job manager 132 to transfer a job from one press to another. Job monitor 132 may be implemented with the HP SmartStream Ultra Job Manager or similar software.

Product Pools and PS Bootstrap Job Ticket

As described above, each product pool 102 defines a job ticket template. When a job is dropped into a product pool 102, print server 106 creates a job ticket with the attributes of the job ticket template. The job ticket template defines attributes including the number of copies, the substrate name, the page size, collated/un-collated, duplex/simplex, and the job priority. The job priority may rank a job from a low priority of one to a high priority of 100.

As described above, in one example, a PS bootstrap job ticket is associated with a job to override the job ticket template. In particular, the job priority in the PS bootstrap job ticket overrides the job priority in the job ticket template. PS bootstrap job ticket includes a reference to the associated job. In the example, product pools 102-1 to 102-I are used instead to organize the jobs by their priority (e.g., by their latest delivery time). The product pool priority is used to specify the RIP priority (the order in which jobs are sent to RIP instances 110) and to which post-RIP queue 116 or 118 each job is sent. In one example, PLB 122 uses the latest delivery time specified in the job file name by convention to determine the press priority (the order which jobs are sent to presses 124). In another example, PLB 122 uses the job priority specified in the job file to determine the press priority. The press uses the job priority in the job file to determine the printing order of jobs loaded on the press.

Figure 2:
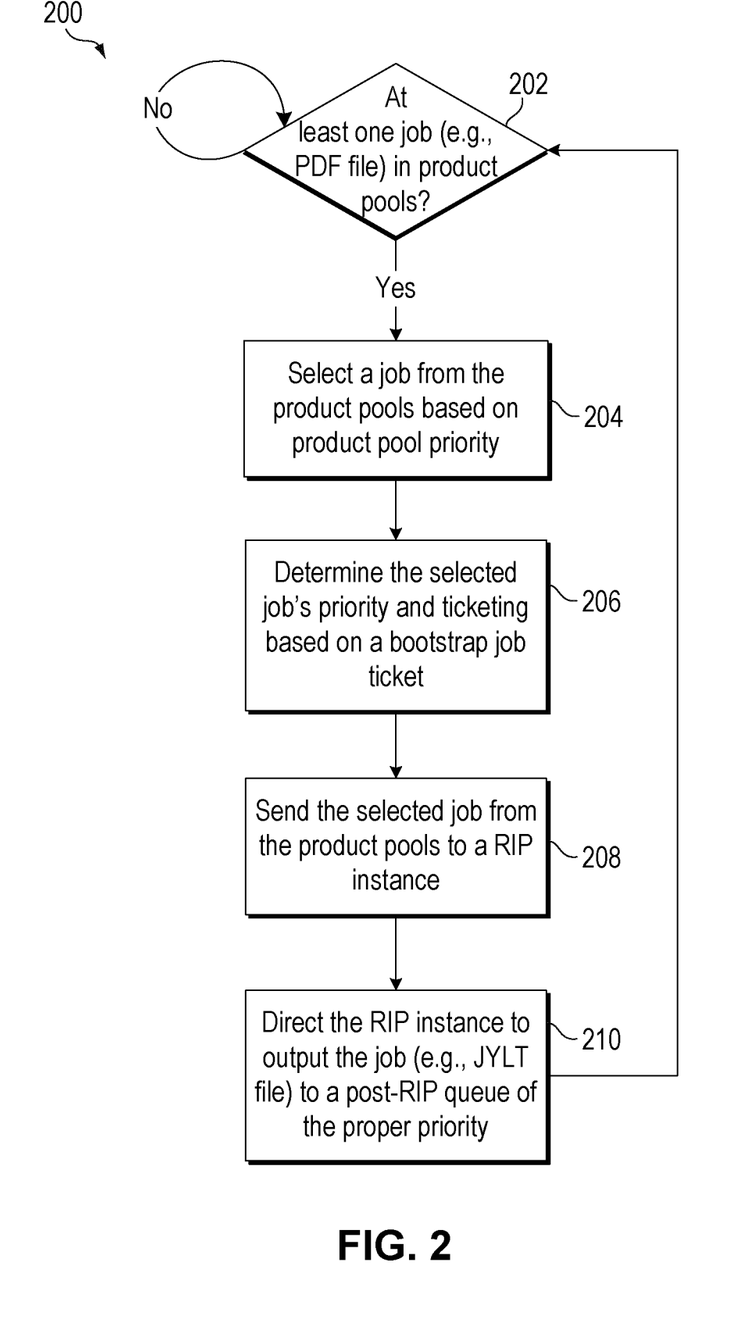
FIG. 2 is a flowchart of a method for a print server of FIG. 1 to send jobs from product pools to raster image processor (RIP) instances and direct outputs from the RIP instances to post-RIP queues on NAS servers in one example of the present disclosure.

FIG. 2 is a flowchart of a method 200 for a print server 106 to send jobs from product pools 102 to RIP instances 110 and direct outputs from RIP instances 110 to post-RIP queues 116, 118 on NAS servers 112 in one example of the present disclosure. Method 200 begins in block 202.

In block 202, print server 106 starts to monitor product pools 102 to determine if there is at least one job in product pools 102. When there is at least one job in product pools 102, block 202 is followed by block 204. Otherwise block 202 loops back to itself.

In block 204, print server 106 selects a job from product pools 102 based on product pool priority. Print server 106 first looks at product pool 102-1 having the highest priority to see if it contains any jobs. In one example, when product pool 102-1 has multiple jobs, print server 106 selects a job on a first-come, first served basis (i.e., in the order which jobs were written to product pool 102-1). In another example, print server 106 selects a job based on the job priority specified for product pool 102-1 or the bootstrap job ticket. When product pool 102-1 does not have any jobs, print server 106 looks in product pool 102-2 having the next highest priority and repeats the process until print server 106 selects a job. Block 204 is followed by block 206.

In block 206, print server 106 determines the selected job's priority and ticketing based on the job's bootstrap job ticket so the parameters in the bootstrap job ticket override the default values of the product pool to determine how the job is RIPed and how the job is printed. Specifically the job priority of the bootstrap job ticket overrides the job priority of the job ticket template of the product pool and controls how PLB 122 later allocates the job from post-RIP queues 116 or 118 to a press 124. Block 206 is followed by block 208.

In block 208, print server 106 selects a RIP instance 110 and sends the selected job to the selected RIP instance 110. In one example, print server 106 selects the least loaded of the RIP instances 110 allocated to the particular product pool of the selected job. Block 208 is followed by block 210.

In block 210, print server 106 selects a post-RIP queue 116 or 118 and directs the selected RIP instance 110 to output the job to the selected post-RIP 116 or 118. Print server 106 directs a job to a fast track post-RIP queue 116 when the product pool priority of the selected job is greater than or equal to a threshold product pool priority. Otherwise print server 106 directs the job to a normal post-RIP queue 116. In one example, print server 106 selects a post-RIP queue 116 or 118 on the least loaded NAS server 112. Method 200 then loops back to block 202 to process another job.

Press Load Balancer and Option Rule File

As described above, PLB 122 monitors jobs in post-RIP queues 116, 118 in NAS servers 112 and the current loads and the substrates installed on presses 124. PLB 122 allocates jobs to presses 124 by taking into account considerations including (1) the number of sheets and the required substrate of each job, (2) the substrate installed on each press, (3) the press preference specified in option rule file 126, (4) the load on each press determined by the number of sheets still to be printed in the current job and the number of sheets summed over all the jobs in the print queue for the press, and (5) the state of each press. Note that the print queue is the list of jobs loaded on a press waiting to be printed. Jobs can be loaded onto the press but not queued to print (Held List), and jobs can be kept after printing so that the operator can reprint them if needed (Retain List). After allocating a job, PLB 112 moves the job from its post-RIP queue 116 or 118 to a press loader queue 120 of the selected press 124.

As described above, PLB 122 looks to option rule file 126 to make certain decisions. In one example, option rule file 126 is an XML file with three main sections: selection, substrates, and presses.

The selection section specifies the sorting method for the jobs in post-RIP queues 116, 118 on NAS servers 112. The jobs may be sorted by (1) the name of each job file in alphanumerical order, (2) the job priority specified in each job file, (3) the date/time each job is written to a post-RIP queue 116 or 118, and (4) the date/time each job is submitted to a product pool 102. In one example, PLB 122 sorts the jobs in post-RIP queues 116, 118 by their file names in alphanumerical order. By convention, each job is named according to their latest delivery date using the format "YYYYMMDD_hhmm_job_name" where "YYYYM-MDD" is the year, month, and date, "hhmm" is the time, and "job_name" is a job description that helps the operators to recognize the job.

The substrates section has two subsections: substrate and default. The substrate subsection includes multiple substrate sub-subsections. Each substrate sub-subsection specifies a substrate name and a list of "preferred" presses for this substrate. The default subsection includes a section with a list of presses to be used if the required substrate is not defined in the substrates subsection.

The presses section has two subsections: press and default. The press subsection may have zero or more press sub-subsections. Each press sub-subsection specifies a press name and the high level for the named press, in minutes of printing. Any press section listed overrides the default setting in the default subsection. The default subsection specifies the default high level, in minutes of printing, for all the presses except presses listed explicitly in the press subsection.

In one example, option rule file 126 may also include rules related to the required inks for a job that guide PLB 122 in selecting a press 140 based on the inks installed on presses 140.

Figure 3:
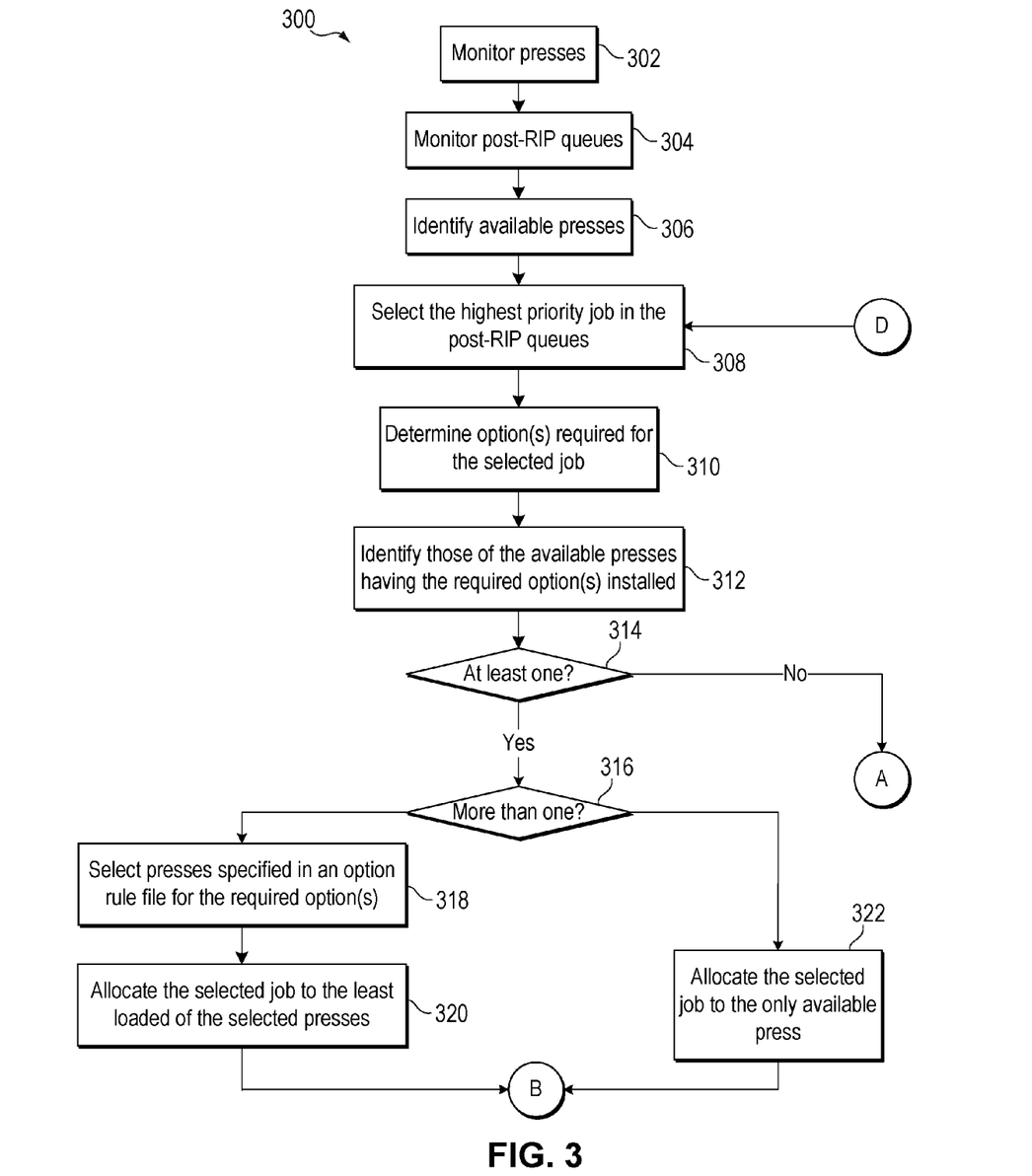
FIGS. 3, 4, and 5 combine to form a flowchart of a method for a press load balancer of FIG. 1 to allocate jobs to presses in one example of the present disclosure.
Figure 4:
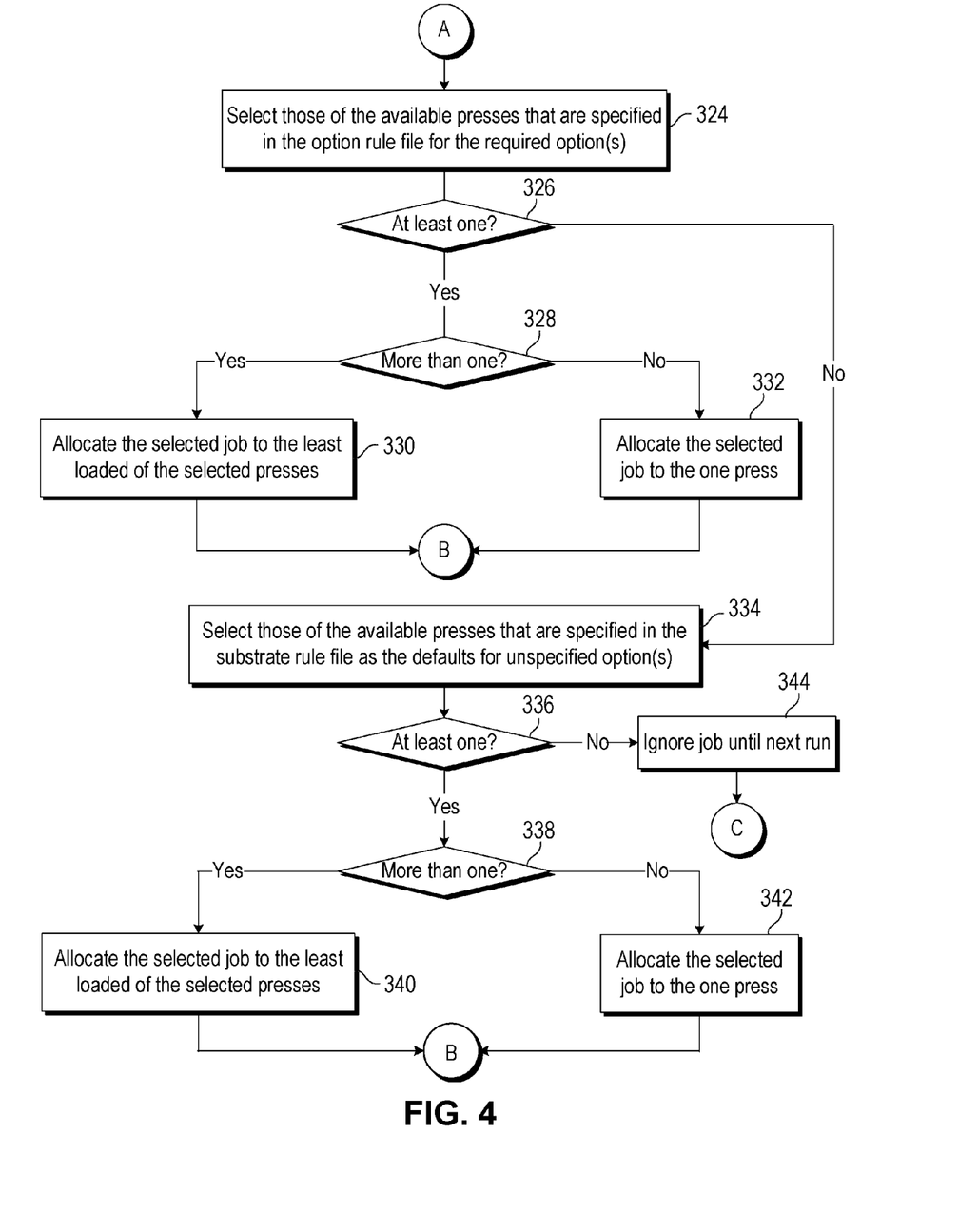
Figure 5:
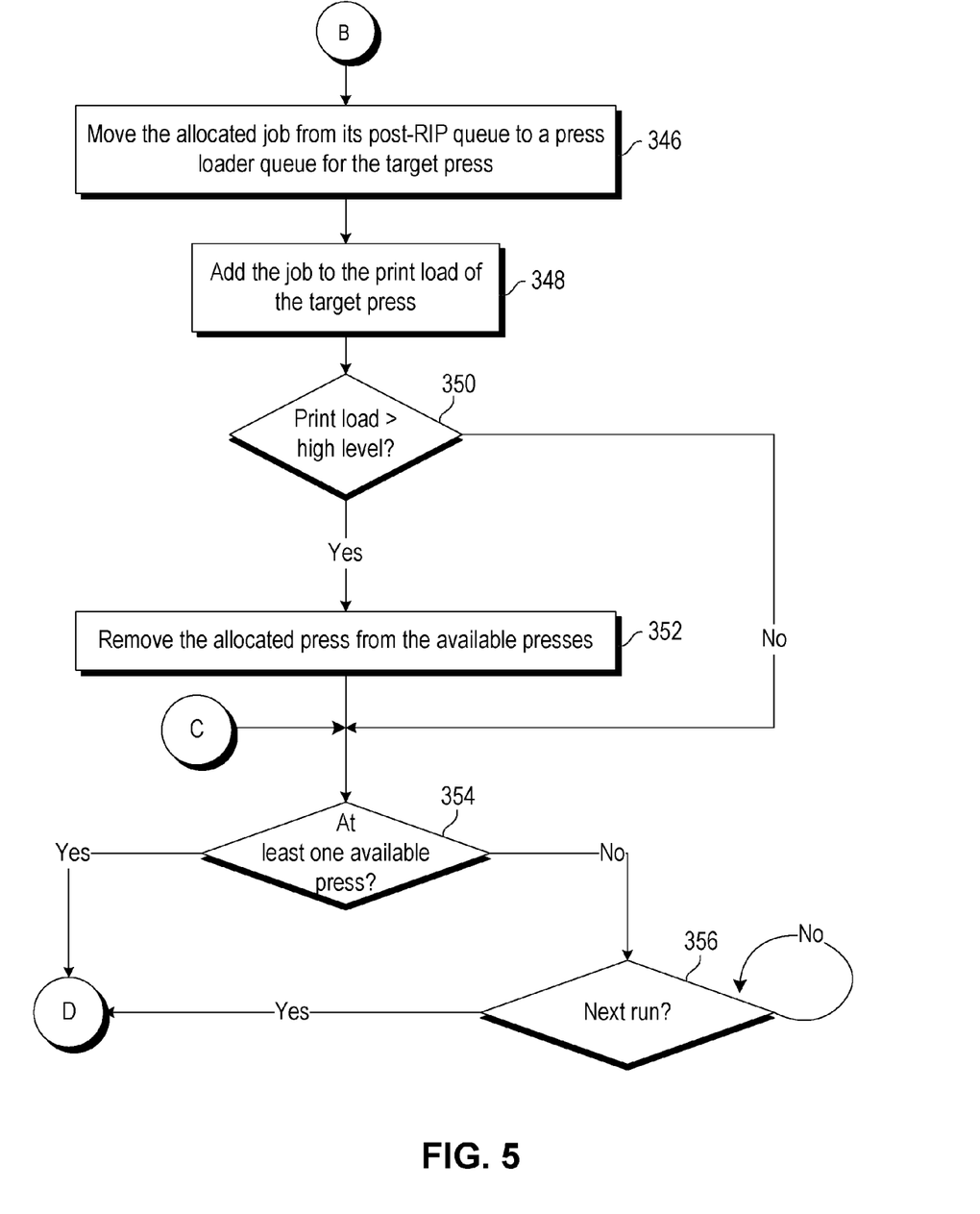

FIGS. 3, 4, and 5 combine to form a flowchart of a method 300 for PLB 122 to allocate jobs to presses 140 in one example of the present disclosure. Method 300 begins in block 302 on FIG. 3.

In block 302, PLB 122 starts to monitor the current loads and options installed on presses 124 (e.g., the installed substrates on presses 124). Block 302 is followed by block 304.

In block 304, PLB 122 starts to monitor post-RIP queues 116, 118 on NAS servers 112 for jobs. Block 304 is followed by block 306.

In block 306, PLB 122 identifies available presses. A press is available when it is online, it is at least in a standby state, and the number of sheets to be printed by the press is below a high level specified in option rule file 126. Block 306 is followed by block 308.

In block 308, PLB 122 selects the highest priority job in post-RIP queues 116, 118 on NAS servers 112. In one example, PLB 122 determines the highest priority job by the priority of post-RIP queues 116, 118 and the alphanumeric order of the file names. As described above, the file names reflect the latest delivery dates of the jobs. PLB 122 first looks at all the jobs in fast track post-RIP queues 116 on NAS servers 112 and selects the job having the lowest alphanumeric name. When all the jobs in fast track post-RIP queues 116 have been processed, PLB 122 looks at all the jobs in normal post-RIP queues 118 on NAS servers 112 and selects the job having the lowest alphanumeric name. In other examples, PLB 122 may select the highest priority job based on other criteria. Block 308 is followed by block 310.

In block 310, PLB 122 determines an option required for the selected job (e.g., the substrate required for the selected job) from the job itself. Block 310 is followed by block 312.

In block 312, PLB 122 identifies those of the available presses that have the required substrate installed. Block 312 is followed by block 314.

In block 314, PLB 122 determines if there is at least one identified press. If so, block 314 is followed by block 316. Otherwise block 314 is followed by block 324 on FIG. 5.

In block 316, PLB 122 determines if there are multiple identified presses. If so, block 316 is followed by block 318. Otherwise block 316 is followed block 322.

In block 318, PLB 122 selects "preferred" presses specified in option rule file 126 for the required substrate from the identified presses. Block 318 is followed by block 320.

In block 320, PLB 122 allocates the selected job to the least loaded press from the selected presses. Block 320 is followed by block 346 on FIG. 5.

In block 322, PLB 122 allocates the selected job to the only available press with the required substrate installed. Block 322 is followed by block 346 on FIG. 5.

Referring to FIG. 4, in block 324, PLB 122 selects those of the available presses that are specified in option rule file 126 for the required substrate. Block 324 is followed by block 326.

In block 326, PLB 122 determines if there is at least one selected press. If so, block 326 is followed by block 328. Otherwise block 326 is followed by block 334.

In block 328, PLB 122 determines if there are multiple selected presses. If so, block 328 is followed by block 330. Otherwise block 328 is followed by block 332.

In block 330, PLB 122 allocates the selected job to the least loaded press from the selected presses. Block 330 is followed by block 346 on FIG. 5.

In block 332, PLB 122 allocates the selected job to the only selected press. Block 322 is followed by block 346 on FIG. 5.

In block 334, PLB 122 selects those of the available presses that are specified in option rule file 126 as defaults for unspecified substrates. Block 334 is followed by block 336.

In block 336, PLB 122 determines if there is at least one selected press. If so, block 336 is followed by block 338. Otherwise block 336 is followed by block 344.

In block 338, PLB 122 determines if there are multiple selected presses. If so, block 338 is followed by block 340. Otherwise block 338 is followed by block 342.

In block 340, PLB 122 allocates the selected job to the least loaded press from the selected presses. Block 340 is followed by block 346 on FIG. 5.

In block 342, PLB 122 allocates the selected job to the only selected press. Block 342 is followed by block 346 on FIG. 5.

In block 344, PLB 122 ignores the selected job until the next run through method 300 as one of the available presses can handle the selected job. Block 344 is followed by block 354 on FIG. 5.

Referring to FIG. 5, in block 346, PLB 122 moves the allocated job from its post-RIP queue 116 or 118 to a press loader queue 120 for the target press 124. As described above, press loader 128 monitors press loader queues 120 on NAS servers 112 and loads the jobs via the appropriate press controllers 130 to the corresponding presses 124. Block 346 is followed by block 348.

In block 348, PLB 122 adds the allocated job to target press 140 to a list of jobs loaded on the target press 140 (e.g., a print load of target press 140). Block 348 is followed by block 350.

In block 350, PLB 122 determines if the print load of the target press 140 is greater than the high level specified in option rule file 126. If so, block 350 is followed by block 352. Otherwise block 350 is followed by block 354.

In block 352, PLB 122 removes the target press 140 from the list of available presses. Block 352 is followed by block 354.

In block 354, PLB 122 determines if there is at least one available press. If so, method 300 loops back to block 308 on FIG. 3 to allow the next highest priority job. Otherwise block 354 is followed by block 356.

In block 356, PLB 122 determines if it is time for a next run through method 300 again. In one example, PLB 122 runs through method 300 every 20 seconds. If so, method 300 loops back to block 306 on FIG. 3. Otherwise block 356 loops onto itself until it is time to run through method 300 again.

Method 300 has been explained using the example that the jobs specify the required substrates. Method 300 is equally applicable when the jobs specify another required option, such as a set of required inks or required finishing equipment, or a combination of required options, such as a required substrate with a set of required inks.

Figure 6:
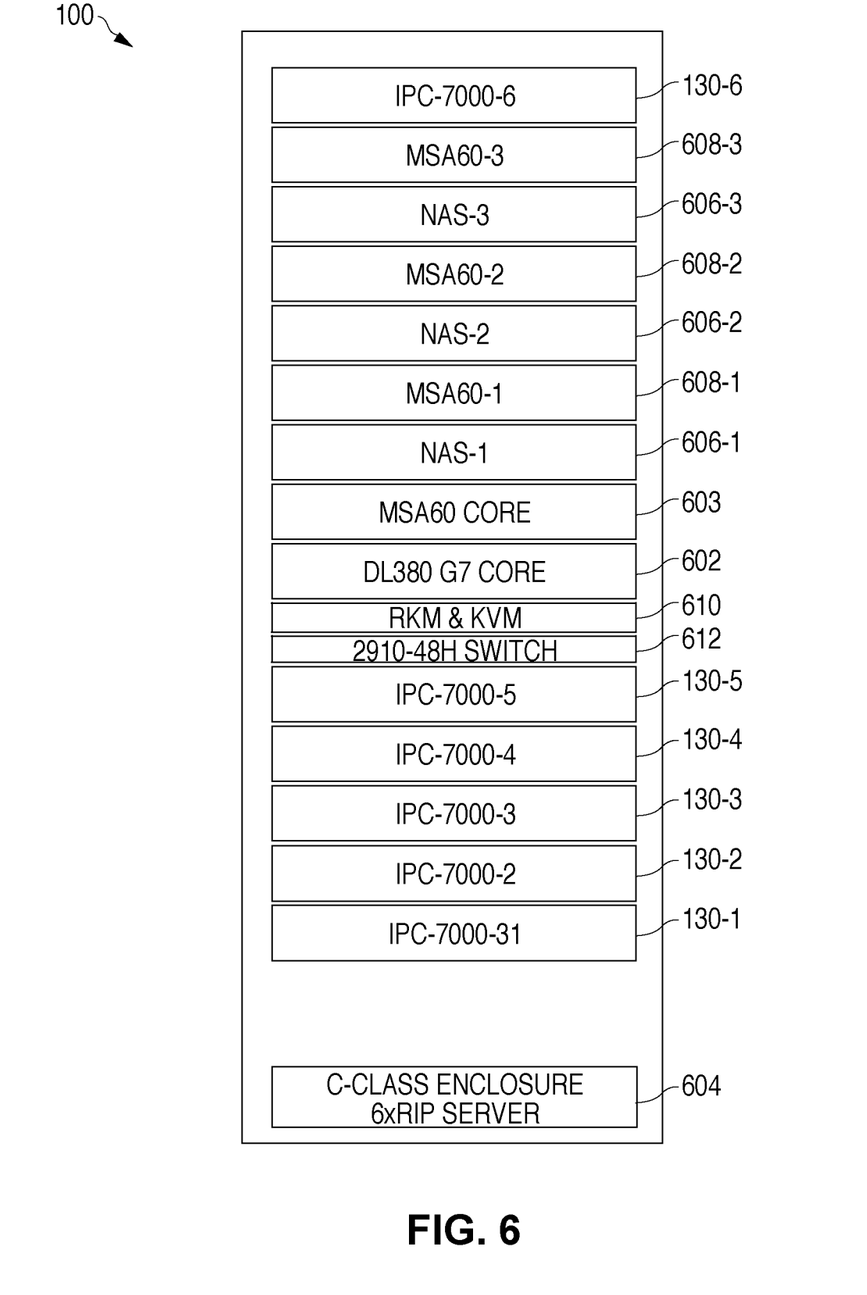
FIG. 6 is a block diagram of an implementation of the press system of FIG. 1 in one example of the present disclosure.

FIG. 6 is a hardware implementation of press system 100 in one example of the present disclosure. System 100 includes a DFE server computer 602, drives 603 for DFE server computer 602, RIP server computers 604, NAS server computers 606-1, 606-2, and 606-3 (referred to as "NAS servers 606" collectively or "NAS server computer 606" for a generic individual NAS server computer), storage arrays 608-1, 608-2, and 608-3 (referred to as "storage arrays 608" collectively), press controllers 130-1, 130-2, 130-3, 130-4, 130-5, and 130-6, a rack mounted console 610, and a network switch 612. DFE server computer 602 executes computer readable instructions for implementing print server 106, PLB 122, press loader 122 and job manager 132. RIP server computers 604 execute computer readable instructions for implementing RIP servers 108 providing RIP instances 110. NAS server computers 606-1, 606-2, and 606-3 execute computer readable instructions for implementing NAS servers 112-1, 112-2, and 112-3. Storage arrays 608-1, 608-2, and 608-3 provide drives 114 to each NAS server computer 606. Console 610 allows a worker to interact with system 100. Network switch 612 couples DFE server computer 602, RIP server computers 604, NAS server computers 606, storage arrays 608, press controllers 130, and console 610 for communication.

Each computer described above includes a processor, volatile memory (e.g., RAM), and nonvolatile memory (e.g., a hard disk drive). The nonvolatile memory provides a non-transitory computer readable medium that stores the computer readable instructions.

Examples of the present disclosure offer advantages including (1) increased throughput from spreading the printing load evenly over all the presses, (2) reduced operator workload and increased available print time from the automated job allocation, (3) reduced operator workload and increased available time to print from the reduction in the need swap substrates, and (4) reduced job transfer between presses if a press is down and increased available print time as the number of jobs loaded on each press at any time is minimized.

Various other adaptations and combinations of features of the examples disclosed are within the scope of the invention. Numerous examples are encompassed by the following claims.

What is claimed is:

1. A method for load balancing presses, comprising:
    identifying a highest priority print job in a post-raster image processor (RIP) queue;
    determining a required option for the identified highest priority print job;
    determining whether a press of a set of available presses is specified for the required option for the highest priority print job;
    in response to determining that no press is specified for the required option for the highest priority print job,
        identifying an additional set of the available presses specified as default for unspecified options;
        identifying a least loaded press from the additional set of the available presses; and
        allocating the highest priority print job to the least loaded press from the additional set of the available presses, wherein the highest print job is moved from the post-RIP queue to a press loader queue for the least loaded press from the additional set of the available presses; and
    printing, by the least loaded press from the additional set of the available presses, the highest priority print job.

2. The method of claim 1, further comprising:
    selecting a set of preferred presses from the set of the available presses; and
    wherein determining a least loaded press further comprises determining a least loaded press from the set of preferred presses and wherein allocating the highest priority print job further comprises allocating the highest priority print job to the least loaded press of the set of preferred presses.

3. The method of claim 1, further comprising:
in response to a determination that the highest priority print job cannot be allocated to any of the available presses, ignoring the highest priority print job until a next run for allocating the print jobs in the post-RIP queue to the presses.

4. The method of claim 3, further comprising:
adding print jobs allocated to a press to a list of print jobs loaded on that press; and
in response to the list of print jobs loaded on that press exceeding a threshold level, removing that press from the set of available presses.

5. The method of claim 3, further comprising:
in response to the highest priority print job having been allocated or ignored and a determination that at least one press is available:
identifying a next highest priority print job in the post-RIP queue; and
allocating the next highest priority print job to the available press.

6. A non-transitory computer readable medium encoded with executable instructions for execution by a processor to load balance presses, wherein the instructions are to cause the processor to:
identify a highest priority print job in post-raster mage processor (RIP) queue;
determine a required option for the identified highest priority print job;
determine whether a press of a set of available presses is specified for the required option for the highest priority print job;
in response to a determination that no press is specified for the required option for the highest priority print job,
identify an additional set of the available presses specified s defaults for unspecified options;
determine identify a least loaded press from the additional set of the available presses; and
allocate the highest priority print job to the least loaded press from the additional set of the available presses, wherein the highest print job is moved from the post-RIP queue to a press loader queue for the least loaded press from the additional set of the available presses; and
print, by the least loaded press from the additional set of the available presses, the highest priority print job.

7. The non-transitory computer readable medium of claim 6, wherein the executable instructions are further to cause the processor to:
select a set of preferred presses from the set of the available presses; and
wherein to determine a least loaded press and to allocate the highest priority print job, the instructions are further to cause the processor to determine a least loaded press from the set of preferred presses and to allocate the highest priority print job to the least loaded press of the set of preferred presses.

8. The non-transitory computer readable medium of claim 6, wherein the executable instructions are further to cause the processor to:
in response to a determination that the highest priority print job cannot be allocated to any of the available presses, ignore the highest priority print job until a next run for allocating the print jobs in the post-RIP queue to the presses.

9. The non-transitory computer readable medium of claim 8, wherein the executable instructions are further to cause the processor to:
add print jobs allocated to a press to a list of print jobs loaded on that press; and
in response to the list of print jobs loaded on that press exceeding a threshold level, remove that press from the set of available presses.

10. The non-transitory computer readable medium of claim 8, wherein the executable instructions are further to cause the processor to:
in response to the highest priority print job having been allocated or ignored and a determination that at least one press is available:
identify a next highest priority print job in the post-RIP queue; and
allocate the net highest priority print job to the available press.

11. An apparatus to load balance presses, said apparatus comprising:
a processor; and
a memory on which is stored machine readable instructions that are to cause the processor to:
identify a highest priority print job in a post-raster image processor (RIP) queue;
determine a required option for the identified highest priority print job;
determine whether a press of a set of available presses specified for the required option for the highest priority print job;
in response to a determination that no press is specified for the required option for the highest priority print job,
identify an additional set of the available presses specified as defaults for unspecified options;
determine identify a least loaded press from the additional set of the available presses; and
allocate the highest priority print job to the least loaded press from the additional set of the available presses, wherein the highest print job is moved from the post-RIP queue to a press loader queue for the least loaded press from the additional set of the available presses; and
print, by the least loaded press from the additional set of the available presses, the highest priority print job.

12. The apparatus of claim 11, wherein the machine readable instructions are further to cause the processor to:
select a set of preferred presses from the set of the available presses; and
wherein to determine a least loaded press and to allocate the highest priority print job, the machine readable instructions are further to cause the processor to determine a least loaded press from the set of preferred presses and to allocate the highest priority print job to the least loaded press of the set of preferred presses.

13. The apparatus of claim 11, wherein the machine readable instructions are further to cause the processor to:
in response to a determination that the highest priority print job cannot be allocated to any of the available presses, ignore the highest priority print job until a next run for allocating the print jobs in the post-RIP queue to the presses.

14. The apparatus of claim 13, wherein the machine readable instructions are further to cause the processor to:

add print jobs allocated to a press to a list of print jobs loaded on that press; and in response to the list of print jobs loaded on that press exceeding a threshold level, remove that press from the set of available presses.

\* \* \* \* \*

UNITED STATES PATENT AND TRADEMARK OFFICE
CERTIFICATE OF CORRECTION

| | | |
|---|---|---|
| PATENT NO. | : 9,760,325 B2 | Page 1 of 1 |
| APPLICATION NO. | : 14/866238 | |
| DATED | : September 12, 2017 | |
| INVENTOR(S) | : Steve Morris et al. | |

It is certified that error appears in the above-identified patent and that said Letters Patent is hereby corrected as shown below:

In the Drawings

In sheet 1 of 6, Fig. 1, reference numeral 110, delete "RiP" and insert -- RIP --, therefor.

In the Claims

In Column 10, Line 31, in Claim 11, delete "presses specified" and insert -- presses is specified --, therefor.

In Column 8, Line 52, in Claim 1, delete "default" and insert -- defaults --, therefor.

In Column 9, Line 29, 30 approx., in Claim 6, delete "in post – raster mage processor" and insert -- in a post – raster image processor --, therefor.

In Column 9, Line 39, 40 approx., in Claim 6, delete "specified s" and insert -- specified as --, therefor.

In Column 10, Line 20, in Claim 10, delete "net highest" and insert -- next highest --, therefor.

In Column 10, Line 31, in Claim 11, delete "presses specified" and insert -- presses is specified --, therefor.

In Column 10, Line 39, in Claim 11, delete "determine identify" and insert -- identify --, therefor.

Signed and Sealed this
Thirteenth Day of February, 2018

Andrei Iancu
*Director of the United States Patent and Trademark Office*